(12) United States Patent
Yang et al.

(10) Patent No.: US 12,484,948 B2
(45) Date of Patent: Dec. 2, 2025

(54) FLOW REGULATING ASSEMBLY AND FLEXIBLE CRYOPROBE WITH ADJUSTABLE FLOW

(71) Applicant: ACCUTARGET MEDIPHARMA (SHANGHAI) CO., LTD., Shanghai (CN)

(72) Inventors: Chi Yang, Shanghai (CN); Zhaohua Chang, Shanghai (CN)

(73) Assignee: ACCU TARGET MEDIPHARMA (SHANGHAI) CO., LTD., Shanghai (CN)

( * ) Notice: Subject to any disclaimer, the term of this patent is extended or adjusted under 35 U.S.C. 154(b) by 754 days.

(21) Appl. No.: 17/927,341

(22) PCT Filed: Feb. 9, 2021

(86) PCT No.: PCT/CN2021/076191
§ 371 (c)(1),
(2) Date: Nov. 22, 2022

(87) PCT Pub. No.: WO2021/169800
PCT Pub. Date: Sep. 2, 2021

(65) Prior Publication Data
US 2023/0293220 A1    Sep. 21, 2023

(30) Foreign Application Priority Data
Feb. 24, 2020  (CN) .......................... 202010111100.7

(51) Int. Cl.
*A61B 18/02* (2006.01)
*A61B 17/00* (2006.01)
*A61B 18/00* (2006.01)

(52) U.S. Cl.
CPC .... *A61B 18/02* (2013.01); *A61B 2017/00367* (2013.01); *A61B 2018/00577* (2013.01);
(Continued)

(58) Field of Classification Search
CPC ................ A61B 18/02; A61B 18/0218; A61B 2017/00367; A61B 2018/00577;
(Continued)

(56) References Cited

U.S. PATENT DOCUMENTS 5,380,307 A     1/1995  Chee et al.
2006/0025840 A1*  2/2006  Willard ............... A61M 25/104
                                                    604/113
(Continued)

FOREIGN PATENT DOCUMENTS

CN       103930153       7/2014
CN       109730763       5/2019
WO    WO-2021027397 A1 *  2/2021  ............. A61B 18/02

*Primary Examiner* — Ankit D Tejani
*Assistant Examiner* — Joshua Brendon Solomon
(74) *Attorney, Agent, or Firm* — MUNCY, GEISSLER, OLDS & LOWE, P.C.

(57) ABSTRACT

The present invention provides a flow regulating assembly, including a mandrel, where a regulating chamber is provided in the mandrel; a first end portion of the mandrel is provided with a large air outlet, a side wall of the mandrel is provided with a small air outlet, and the large air outlet has an inner diameter less than that of the regulating chamber; a second end portion of the mandrel is connected to a front end of a J-T slot, and a rear end of the J-T slot is connected to a bypass pipe; a sealing member is arranged in the regulating chamber, and the sealing member has an outer diameter less than or equal to the inner diameter of the regulating chamber and greater than the inner diameter of the large air outlet; the sealing member is connected to one end of a traction member, and the other end of the traction member is led out through the bypass pipe. The sealing member axially moves in the regulating chamber under an action of the traction member, and a quantity of effective air outlets is changed by adjusting a position of the sealing member. This solves the problems that flow regulation methods in related technolo-
(Continued)

gies are all implemented through internal control of a host, which is prone to unstable flow, a severe loss of cold energy, an excessively-narrow adjustable range of an operating pressure, and a corresponding excessively-narrow adjustable flow range.

11 Claims, 6 Drawing Sheets

(52) U.S. Cl.
CPC ............... *A61B 2018/00744* (2013.01); *A61B 2018/0262* (2013.01)

(58) Field of Classification Search
CPC .. A61B 2018/00744; A61B 2018/0262; A61B 2018/00101; A61B 2018/0268; A61B 2018/0212; A61B 2018/0293
See application file for complete search history.

(56) References Cited

U.S. PATENT DOCUMENTS

2020/0305948 A1* 10/2020 Trumer .............. A61B 18/0218
2022/0160412 A1* 5/2022 Yang ...................... A61B 18/02

* cited by examiner

FLOW REGULATING ASSEMBLY AND FLEXIBLE CRYOPROBE WITH ADJUSTABLE FLOW

TECHNICAL FIELD

The present invention relates to the field of medical devices, and in particular, to a flow regulating assembly and a flexible cryoprobe with an adjustable flow.

BACKGROUND

Cryotherapy includes two categories: cryoablation and cryoadhesion. The cryoablation requires inactivation of a tissue, resulting in irreversible damage, and is often used for tumor ablation therapy. The cryoadhesion only requires freezing and adhesion of a tissue for taking out, and cryobiopsy, cryotomy and foreign body extraction pertain to cryoadhesion.

In clinical application of cryotherapy, there are many cases where a flow needs to be regulated, such as freezing power regulation, that is, flow regulation. Lower power or flow indicates a smaller growth rate of ice balls. In a case where a required ice ball size has been reached but a freezing time needs to be prolonged, ice balls can be prevented from continuing growing by reducing the power. In addition, a flow required during cooling of a needle is higher than that required for maintaining a low temperature after cooling. Therefore, when the needle is cooled to a lowest temperature, reducing the flow to a minimum value for maintaining the low temperature can greatly reduce gas consumption and achieve the purpose of saving a gas while freezing performance is substantially not affected.

In related technologies, flow regulation methods are all implemented through internal control of a host, such as on-off control of an air inlet valve and regulation by a flow controller or a pressure reducing valve, which usually causes a delayed response at a probe end, and may further lead to the problems of unstable flow, a severe loss of cold energy, an excessively-narrow adjustable range of an operating pressure, and a corresponding excessively-narrow adjustable flow range.

SUMMARY

The present invention provides a flow regulating assembly and a flexible cryoprobe with an adjustable flow, to solve the problems of unstable flow, a severe loss of cold energy, an excessively-narrow adjustable range of an operating pressure, and a corresponding excessively-narrow adjustable flow range in related technologies.

According to a first aspect of the present invention, a flow regulating assembly is provided, and includes a mandrel, where a regulating chamber is provided in the mandrel;
  a first end portion of the mandrel is provided with a large air outlet, a side wall of the mandrel is provided with a small air outlet, and the large air outlet has an inner diameter less than that of the regulating chamber;
  a second end portion of the mandrel is connected to a front end of a J-T slot, and a rear end of the J-T slot is connected to a bypass pipe;
  a sealing member is arranged in the regulating chamber, and the sealing member has an outer diameter less than or equal to the inner diameter of the regulating chamber and greater than the inner diameter of the large air outlet;
  the sealing member is connected to one end of a traction member, and the other end of the traction member is led out through the bypass pipe; and
  a tail end of the bypass pipe is provided with a sealing assembly, the sealing assembly includes a sealing ring, and an inner diameter of the sealing ring matches an outer diameter of the traction member, to allow the traction member to pass through;
  where the sealing member axially moves in the regulating chamber under an action of the traction member, and a quantity of effective air outlets that are in the large air outlet and the small air outlet and are in communication with the bypass pipe is changed by adjusting a position of the sealing member.

Optionally, the sealing member has an outer diameter less than the inner diameter of the regulating chamber, and at least one small air outlet is provided;
  where when the sealing member is at the large air outlet in the first end portion of the mandrel, the large air outlet is closed, and the small air outlet is in communication with the bypass pipe to be used as the effective air outlet for gas venting; and when the sealing member moves to the second end portion of the mandrel under traction of the traction member, the large air outlet and the small air outlet are in communication with the bypass pipe to be used as the effective air outlets for gas venting.

Optionally, the sealing member has an outer diameter equal to the inner diameter of the regulating chamber, at least two rows of small air outlets are provided, each row of small air outlets includes at least one small air outlet, and at least two groups of small air outlets are distributed in an axial direction of the mandrel;
  where when the sealing member is at the large air outlet of the mandrel, each of the small air outlets is in communication with the bypass pipe to be used as the effective air outlet; and when the sealing member moves to the second end portion of the mandrel under an action of the traction member, a quantity of small air outlets that are in communication with the bypass pipe to be used as the effective air outlets is reduced.

Optionally, the sealing assembly further includes a sealing ring pressing member, the sealing ring pressing member is sleeved at the tail end of the bypass pipe, the sealing ring is clamped between the sealing ring pressing member and the tail end of the bypass pipe in a length direction of the bypass pipe, and the sealing ring pressing member is provided with a through hole for the traction member to pass through.

According to a second aspect of the present invention, a flexible cryoprobe with an adjustable flow is provided, and includes the flow regulating assembly according to each of the foregoing embodiments, where the flexible cryoprobe further includes: a needle catheter component, a handle component, and an extension tube component, where the extension tube component includes an air inlet tube, an air return tube, and a regulating tube;
  the flow regulating assembly is arranged inside the needle catheter component, and the needle catheter component is connected to the handle component;
  the air inlet tube is connected to the bypass pipe in the flow regulating assembly, and a gas in the regulating chamber is discharged through the air return tube; and
  the regulating tube is configured to directly or indirectly adjust an axial position of the sealing member in the regulating chamber.

Optionally, the needle catheter component includes a needle tip, a needle, an inner tube assembly, and an outer tube assembly; and the needle includes a needle front section and a needle rear section, the needle tip is arranged on a front end portion of the needle, and the needle rear section is fixedly connected to the inner tube assembly and the outer tube assembly.

Optionally, a thermal insulation layer is arranged between the inner tube assembly and the outer tube assembly, and the thermal insulation layer is a thermal insulation material or a vacuum layer.

Optionally, the regulating chamber is arranged inside the needle front section, the J-T slot is provided inside the inner tube assembly, and a gas in the needle returns through a gap between the inner tube assembly and the J-T slot.

Optionally, the handle component is provided with a toggle rod and a connecting member, one end of the connecting member is connected to the traction member, the other end of the connecting member is connected to the toggle rod, and the axial position of the sealing member in the regulating chamber is adjusted by the toggle rod.

In the flow regulating assembly according to the present invention, the mandrel is provided with the large air outlet and the small air outlet, the sealing member is arranged in the regulating chamber, and the sealing member and the traction member penetrate through the bypass pipe to be connected to the outside, and the sealing member is driven by the traction member to change the quantity of the effective air outlets by changing the position of the sealing member, thus achieving a multi-gear flow regulation function.

BRIEF DESCRIPTION OF DRAWINGS

To describe technical solutions in embodiments of the present invention or in the prior art more clearly, accompanying drawings required in the description of the embodiments or the prior art are briefly described below. Obviously, the accompanying drawings in the following description illustrate only some of the embodiments of the present invention, and a person of ordinary skill in the art can further obtain other accompanying drawings based on these accompanying drawings without creative efforts.

DESCRIPTION OF REFERENCE NUMERALS

1—Flow regulating assembly;
11—Regulating chamber;
111—Large air outlet;
112—Small air outlet;
113—Sealing surface;
12—Sealing member;
121—Sealing ball;
13—J-T slot;
14—Bypass pipe;
141—Sealing ring;
142—Sealing ring pressing member;
15—Thin drawn wire;
16—Thick drawn wire;
2—Needle catheter component;
21—Needle tip;
22—Needle;
221—Needle front section;
222—Needle rear section;
23—Inner tube assembly;
231—Inner flexible catheter;
232—Squeezing tube;
233—Air return connecting tube;
24—Outer tube assembly;
241—Outer flexible catheter;
242—Quick tightening nut;
243—Vacuum chamber;
244—Pagoda joint;
3—Handle component;
31—Front handle;
311—Sliding groove;
312—Limiting hole;
32—Rear handle;
33—Protective elbow;
34—Button assembly;
341—Button box;
342—Sliding block;
3421—Toggle groove;
3422—Clamping rod hole;
343—Button;
344—Connecting rod;
345—Spring;
346—Toggle switch;
347—Switch wire;
4—Extension tube component;
41—Extension tube;
42. Air inlet tube;
43—Air return tube;
44—Shunt tube;
441—Leading-out hole;
45—Vacuum hose.

DESCRIPTION OF EMBODIMENTS

The technical solutions of the embodiments of the present invention are clearly and completely described below with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The terms "first", "second", "third", "fourth", etc. (if any) in the description, claims, and the foregoing accompanying drawings of the present invention are used to distinguish between similar objects and are not necessarily used to describe a specific order or sequence. It should be understood that data used in such a way may be interchanged under appropriate circumstances so that the embodiments of the present invention described herein can be implemented in an order other than those illustrated or described herein. In addition, the terms "including" and "having", and any variations thereof, are intended to cover non-exclusive inclusion, for example, a process, method, system, product, or device including a series of steps or units is not necessarily limited to those steps or units explicitly listed, but may include other steps or units not explicitly listed or inherent to these processes, methods, products, or devices.

The technical solution of the present invention is described in detail below with reference to specific embodiments. The following several specific embodiments can be combined with each other, and the same or similar concepts or processes may not be described in detail again in some embodiments.

An existing cryoadhesion technology is generally only used for cryobiopsy, cryotomy and foreign body extraction in a natural orifice, but its temperature is not low enough and ice balls are small. Thus, the existing cryoadhesion technology cannot effectively implement ablation therapy. If an ablation gas such as nitrogen or argon is introduced to an existing cryoadhesion product, a lower temperature and a larger freezing range cannot be achieved due to a flow limitation of the product itself. An existing cryoablation product can also achieve cryoadhesion by certain means, such as directly introducing carbon dioxide or nitrous oxide, but this method wastes a large amount of gas, and most of cold energy in return air is directly drained, resulting in a large amount of liquid or solid carbon dioxide or nitrous oxide being sprayed from or accumulated at an exhaust port. In addition, if this method is applied to a cryoablation product passing through a natural orifice, a large amount of surplus cold energy of the return air leads to hardening of a flexible catheter section. Thus, a needle sticking to a tissue cannot be taken out from the curved orifice or endoscope forceps channel smoothly.

The present invention provides a flow regulating assembly, which includes a mandrel, where the mandrel internally has a hollow structure, and the hollow structure is a regulating chamber for communicating with a gas.

A first end portion of the mandrel is provided with a large air outlet, a side wall of the mandrel is provided with a small air outlet, and the large air outlet has an inner diameter less than that of the regulating chamber.

The large air outlet and the small air outlet may be understood in such a way that the large air outlet has a pore diameter greater than that of the small air outlet, rather than mean holes of a certain size. Therefore, as long as the large air outlet has a pore diameter greater than that of the small air outlet, pore diameters of any value do not deviate from the foregoing description.

For example, the mandrel has a tubular structure with a uniform inner diameter. The first end portion of the mandrel is provided with an annular structure with a middle through hole, and when the annular structure is fixedly arranged on the first end portion of the mandrel, a large air outlet with an inner diameter less than that of the mandrel is formed.

The small air outlet is provided in the side wall of the mandrel. One or more small air outlets may be provided. When a plurality of small air outlets are provided, the plurality of small air outlets are provided in different axial positions. At the same axial position, different small air outlets may be provided in different radial positions. In addition, the small air outlets may have the same pore diameter and size, or have different pore diameters and sizes in implementations.

A second end portion of the mandrel is connected to a front end of a J-T slot, and a rear end of the J-T slot is connected to a bypass pipe. For example, the J-T slot is a flexible hose, and may be a flexible tube made of metal or another low-temperature-resistant material. The large air outlet and the small air outlet are located on a same side of the bypass pipe in an axial direction of the mandrel.

A sealing member is arranged in the regulating chamber, and the sealing member has an outer diameter less than or equal to an inner diameter of the regulating chamber and greater than an inner diameter of the large air outlet. The sealing member can axially move in the regulating chamber, and a quantity of effective air outlets in the large air outlet and the small air outlet is changed by adjusting a position of the sealing member. The effective air outlet is an air outlet which is not blocked by a sealing member and can allow a gas to pass through.

The sealing member is connected to one end of a traction member, and the other end of the traction member is led out through the bypass pipe. The traction member is configured to pull the sealing member to move in the axial direction of the mandrel to adjust the position of the sealing member. For example, the bypass pipe may be a three-way pipe structure directly arranged on the side wall of the mandrel and formed with two ends of the mandrel, and the traction member is connected to the sealing member in the mandrel through the bypass pipe; or the bypass pipe is a leading-out structure from the regulating chamber through another pipeline, and is connected to the sealing member in the regulating chamber through the pipeline.

The sealing member axially moves in the regulating chamber under an action of the traction member, and a quantity of effective air outlets is changed by adjusting the position of the sealing member.

In summary, in the flow regulating assembly according to the present invention, the mandrel is provided with the large air outlet and the small air outlet, the sealing member is arranged in the regulating chamber, and the sealing member and the traction member penetrate through the bypass pipe to be connected to the outside, and the sealing member is driven by the traction member to change the quantity of the effective air outlets by changing the position of the sealing member, thus achieving a multi-gear flow regulation function.

Figure 1:
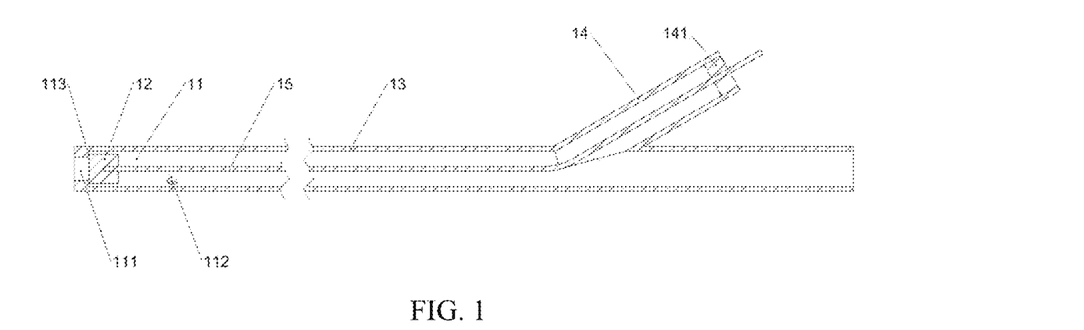
FIG. 1 is a schematic structural diagram of a flow regulating assembly during axial sealing in an embodiment of the present invention.
Figure 2:
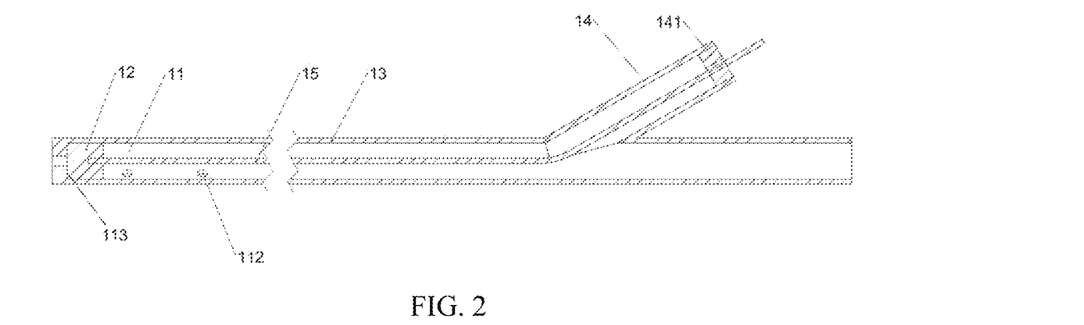
FIG. 2 is a schematic structural diagram of a flow regulating assembly during radial sealing in an embodiment of the present invention.

FIG. 1 is a schematic structural diagram of a flow regulating assembly during axial sealing in an embodiment of the present invention; and FIG. 2 is a schematic structural diagram of a flow regulating assembly during radial sealing in an embodiment of the present invention. With reference to FIG. 1, a flow regulating assembly 1 includes at least a regulating chamber 11, a sealing member 12, a J-T slot 13, a bypass pipe 14, and a thin drawn wire 15.

The sealing member 12 has an outer diameter less than an inner diameter of the regulating chamber 11 and greater than an inner diameter of a large air outlet 111. When the sealing member 12 is positioned on a first end portion of a mandrel, because the sealing member 12 has an outer diameter greater than the inner diameter of the large air outlet 111, the large air outlet 111 is sealed by the sealing member 12. As a result, a gas in the regulating chamber 11 cannot be discharged through the large air outlet 111, but can only be discharged through a small air outlet 112 provided in a side wall of the mandrel, that is, in this case, the large air outlet is closed, and the small air outlet is in communication with the bypass pipe, to be used as the effective air outlet for gas venting. Optionally, the sealing member 12 may have a spherical structure or another shape that can block the large air outlet 111. No matter what shape is provided, the shape does not depart from the scope of this embodiment.

When an external force acts on a traction member to pull the sealing member 12, the sealing member 12 moves away from the large air outlet 111 under traction of the traction member. Because the sealing member 12 has an outer diameter less than the inner diameter of the regulating chamber 11, after the sealing member 12 leaves the large air outlet 111, the gas passes through a gap between the sealing member 12 and the mandrel, so that the gas in the regulating chamber 11 can be discharged simultaneously from the large air outlet 111 and the small air outlet 112. In this case, the large air outlet 111 and the small air outlet 112 are both in communication with the bypass pipe to be used as the effective air outlet for gas venting, and the flow regulating assembly reaches a maximum gas venting quantity and is in a high flow mode.

When the external force disappears and the sealing member 12 moves forward to the end under the action of the inlet air flow, the sealing member 12 blocks the large air outlet 111 to form axial seal, and the gas in the entire flow regulating assembly 1 is discharged through only the small air outlet 112. In this case, the flow regulating assembly 1 is in a low flow mode in which the gas flow is less than that of the high flow mode.

With reference to FIG. 2, at least two rows of small air outlets are provided, each row of small air outlets includes at least one small air outlet, and different groups of small air outlets 112 are provided in different axial positions in the side wall of the mandrel. That is, at least two groups of small air outlets are distributed in an axial direction of the mandrel; the sealing member 12 has an outer diameter equal to an inner diameter of the regulating chamber 11 and greater than an inner diameter of a large air outlet 111. When the sealing member 12 is positioned on a first end portion of the mandrel, because the sealing member 12 has an outer diameter greater than the inner diameter of the large air outlet 111, the large air outlet 111 is sealed by the sealing member 12. As a result, a gas in the regulating chamber 11 cannot be discharged through the large air outlet 111, but can only be discharged through a small air outlet provided in the side wall of the mandrel. In this case, each of the small air outlets is in communication with the bypass pipe, to be used as the effective air outlet.

When the external force acts on the traction member to pull the sealing member 12, the sealing member 12 is pulled away from the large air outlet 111 by the traction member. Because the sealing member 12 has an outer diameter equal to the inner diameter of the mandrel, after the sealing member 12 leaves the large air outlet 111, the gas cannot be discharged through the large air outlet 111, but can only be discharged through the small air outlets 112. As the sealing member 12 continues to move in the axial direction, the sealing member 12 sequentially blocks a plurality of small air outlets 112, thus achieving an effect of changing the flow. This may also be understood as that the quantity of small air outlets that are in communication with the bypass pipe to be used as the effective air outlets is reduced.

Specifically, when the blocked small air outlets 112 are different, corresponding small air outlets that cannot vent the gas introduced through the bypass pipe include the small air outlets 112 directly blocked by the sealing member and small air outlets 112 in front thereof. Furthermore, the small air outlets 112 (i.e., effective air outlets) that can vent the gas introduced through the bypass pipe are small air outlets located behind the sealing member 12 at present. The change in the quantity of these small air outlets can achieve the effect of changing the flow.

When the external force disappears and the sealing member 12 moves forward to the end under the action of the inlet air flow, the sealing member 12 blocks the large air outlet 111 to implement axial seal, and all the small air outlets 112 in the entire flow regulating assembly 1 can be used to vent the gas, thereby implementing the high flow mode. For example, a plurality of small air outlets 112 are provided in the same axial position, thereby ensuring the gas venting quantity of the small air outlets 112.

Optionally, the sealing member 12 is made of metal, and airtightness between assemblies is ensured through precision machining. Alternatively, a surface of the sealing member 12 is made of a material with a certain elastic deformation capacity to ensure the sealing effect, such as a low-temperature-resistant rubber material, which can effectively reduce precision requirement of a machining and production process.

To ensure the sealing effect, a sealing surface 113 is provided at the large air outlet 111, and the sealing surface 113 is a contact surface matching the shape of the sealing member 12. Alternatively, a sealing ring made of a low-temperature-resistant rubber material is arranged at the large air outlet 111 to ensure an airtight effect between the large air outlet 111 and the sealing member 12.

A sealing assembly is arranged between the traction member and the bypass pipe 14 to ensure an airtight effect on the regulating chamber 11. The sealing assembly includes a sealing ring 141 and a sealing ring pressing member 142, which are configured to dynamically seal a gap between the bypass pipe 14 and a thick drawn wire to prevent air leakage. The sealing ring pressing member 142 and the bypass pipe 14 may be connected to each other by using threads.

In summary, in the foregoing implementation, the sealing member is connected to the traction member, the traction member makes the sealing member communicate with the outside by using the bypass pipe, and the sealing member axially moves under the driving of the traction member. When the sealing member is at a different position, the quantity of effective air outlets changes, so that the gas venting quantity of the mandrel is adjusted, thereby achieving a function of flow regulation.

Figure 3:
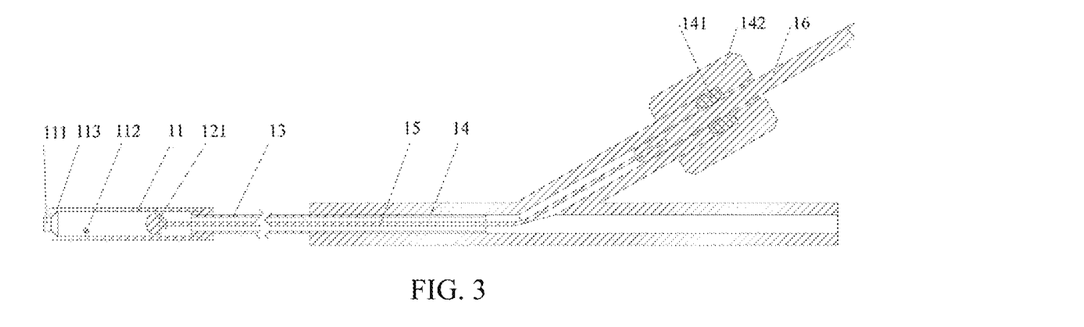
FIG. 3 is a schematic structural diagram of a flow regulating assembly in a high flow state in an embodiment of the present invention.
Figure 4:
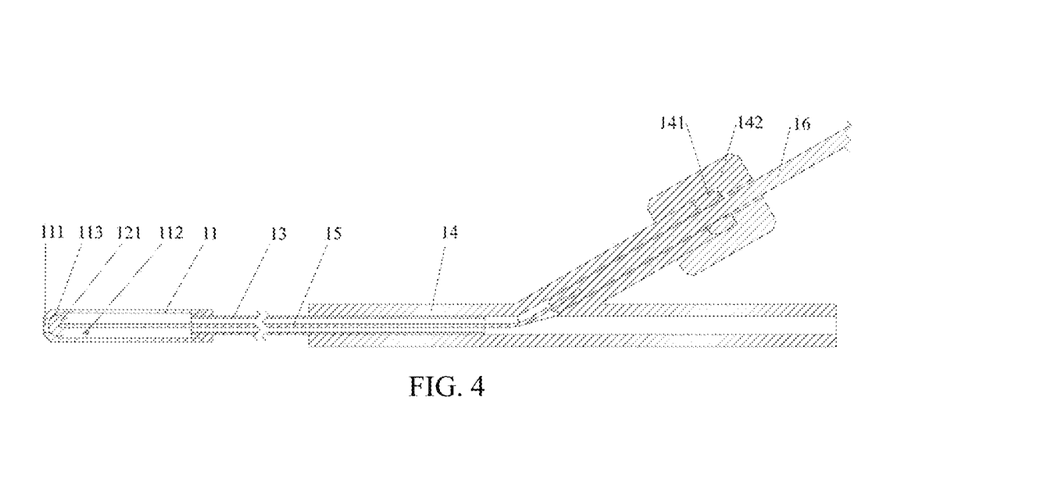
FIG. 4 is a schematic structural diagram of a flow regulating assembly in a low flow state in an embodiment of the present invention.

FIG. 3 is a schematic structural diagram of a flow regulating assembly in a high flow state in an embodiment of the present invention; and FIG. 4 is a schematic structural diagram of a flow regulating assembly in a low flow state in an embodiment of the present invention. A flow regulating assembly 1 includes a regulating chamber 11, a sealing member 12 (such as a sealing ball 121), a J-T slot 13, a bypass pipe 14, and a traction member.

In a possible implementation, the traction member may be a thin traction wire, or may be two or more sections of traction wires connected to each other. When the traction member is two or more sections of traction wires connected to each other, the traction member includes a thin drawn wire 15 connected to the sealing member 12 to reduce an impact of the thin drawn wire on an internal air pressure. The section led out from the bypass pipe 14 is a thick drawn wire 16, and the thick drawn wire 16 has a diameter greater than that of the thin drawn wire 15, which facilitates operations on the thin drawn wire such as fixing and force application, increases the strength, and reduces a risk of failure.

The regulating chamber 11 is provided with a large air outlet 111 located at the front end, small air outlets 112 located in the side wall, and a sealing surface 113 located behind the large air outlet 111, where at least two symmetrical small air outlets 112 are provided, and the bypass pipe 14 is provided with a sealing ring 141 and a sealing ring pressing member 142. The front and rear of the J-T slot 13 are fixedly sealed with a rear end of the regulating chamber 11 and a front end of the bypass pipe 14 respectively. The thin drawn wire 15 is fixedly connected to the sealing ball 121 and the thick drawn wire 16. The sealing ball 121 is located inside the regulating chamber 11, and the sealing ball 121 has a diameter less than the inner diameter of the regulating chamber 11, so that the sealing ball 121 can move back and forth in the regulating chamber 11, and a gap between the sealing ball and the regulating chamber does not affect the overall flow of inlet air.

In a possible implementation, the thin drawn wire 15 is located inside the J-T slot 13; the thin drawn wire 15 has a diameter less than the inner diameter of the J-T slot 13; and the thin drawn wire 15 can move back and forth in the J-T slot without hindering the air flow from passing through. The thick drawn wire 16 is located inside a branch of the bypass pipe 14.

During normal operation, the gas enters from a rear end of the bypass pipe 14, is conveyed to the inside of the regulating chamber 11 through the inside of the J-T slot 13, and is finally discharged through the air outlet of the regulating chamber 11. When the thick drawn wire 16 is pulled backward, the thin drawn wire 15 finally drives the sealing ball 121 to move backward. In this case, both the large air outlet 111 and the small air outlet 112 of the regulating chamber are used for gas venting, and the corresponding flow is maximum. In this case, a cryoablation mode can be implemented by introducing nitrogen or argon. When the thick drawn wire 16 is pushed forward, a pulling force on the thin drawn wire 15 disappears, and the sealing ball 121 moves forward under the action of the inlet air flow, and finally abuts against the sealing surface 113 to block the large air outlet 111. In this case, only the small air outlet 112 is used for gas venting, and the corresponding flow is minimum. In this case, a cryoadhesion mode can be implemented by introducing carbon dioxide or nitrous oxide.

Since the gas flow regulation method and process are the same as those of the examples in FIG. 1 and FIG. 2, details are not described in this embodiment again.

In summary, in this embodiment, through the arrangement of the traction member connected to the sealing member, the axial position of the sealing member is manually adjusted through external force application, so that a user can freely adjust a flow size, thereby effectively improving ease of use.

Figure 5:
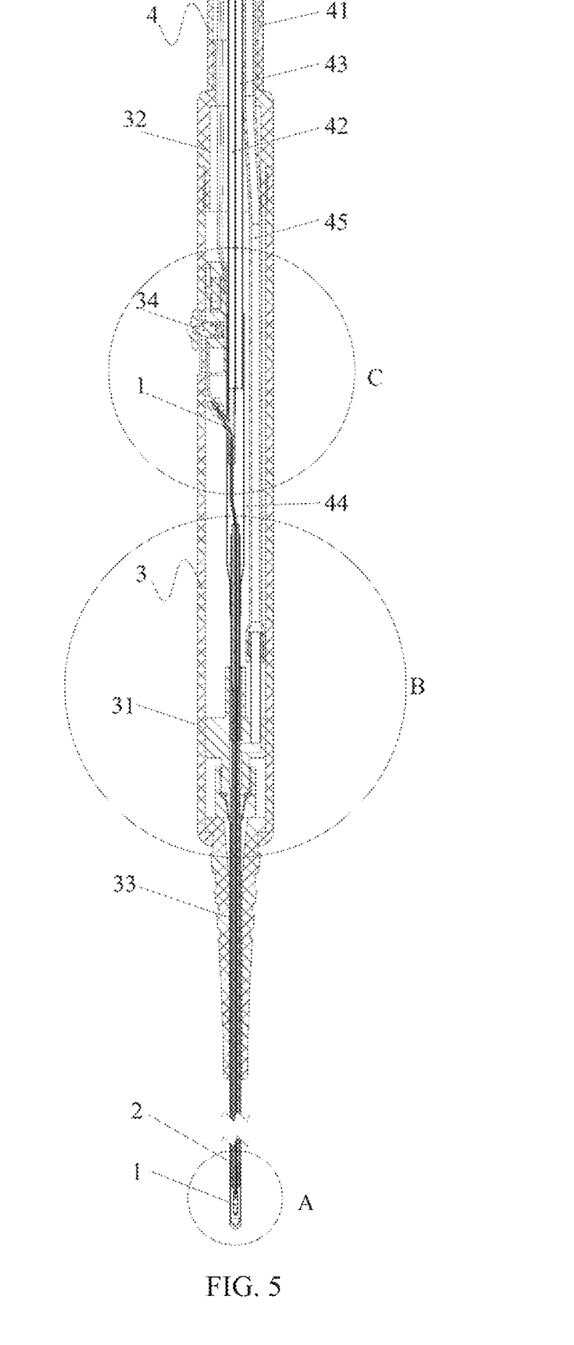
FIG. 5 is a schematic structural diagram of a flexible cryoprobe with an adjustable flow in an embodiment of the present invention.

The present application further provides a flexible cryoprobe with an adjustable flow. FIG. 5 is a schematic structural diagram of a flexible cryoprobe with an adjustable flow in a low flow state in an embodiment of the present invention. The flexible cryoprobe with an adjustable flow according to the present application includes the flow regulating assembly 1 according to the foregoing embodiments of FIG. 1 to FIG. 4, a needle catheter component 2, a handle component 3, and an extension tube component 4, where the handle component 3 includes a front handle 31, a rear handle 32, a protective elbow 33, and a button assembly 34. The button assembly 34 is configured to switch between the low flow mode and the high flow mode. The extension tube component 4 includes an extension tube 41, an air inlet tube 42, an air return tube 43, a shunt tube 44, and a vacuum hose 45. The entire flow regulating assembly 1 is arranged inside the needle catheter component 2 and the shunt tube 44. The protective elbow 33 is arranged on a front section of the handle component 3, and is configured to protect a flexible pipeline at a front end of the flexible cryoprobe. A gas in a regulating chamber is discharged through the air return tube. A regulating tube is configured to directly or indirectly regulate and control the axial position of the sealing member in the regulating chamber, and for example, may be connected to the traction member in the flow regulating assembly.

In summary, in the flexible cryoprobe with an adjustable flow according to the present application, the flow regulating assembly with an adjustable flow is arranged in a needle rod, and the gas flow inside the needle rod is manually controlled by using the traction member. The gas flow is regulated in the needle rod, and the temperature at the needle rod is manually controlled, which solves the problems of unstable flow, a severe loss of cold energy, an excessively-narrow adjustable range of an operating pressure, and a corresponding excessively-narrow adjustable flow range which easily occur inside a host in related technologies.

Since in the present invention, the flow regulating assembly is placed in an effective treatment area (needle) at the most remote end, the user does not need to worry about the loss of cold energy during flow regulation, and it can be ensured that the flow regulation can be implemented when the air inlet pressure of the air outlet is almost unchanged. The flow regulation can be fed back to a heat absorption amount of a lesion tissue almost without delay, so that the cryoprobe with an adjustable flow according to the present invention can be used in the high-pressure field. An existing technology of using a flow controller for flow regulation is relatively stable, but the flow controller can only be placed in the host far away from the effective treatment area (needle). Thus, a change of cold energy at the needle lags behind the flow regulation. In addition, there are few flow controllers that can implement stable flow control under high pressure, and when a required flow is relatively low, a very small flow cross section appears at the flow controller. In this way, a relatively low temperature is generated inside the flow controller, which causes the loss of cold energy and cannot implement effective cooling of the needle, thus making the existing flow controller generally unsuitable for a state of a high-pressure gaseous flow.

Figure 6:
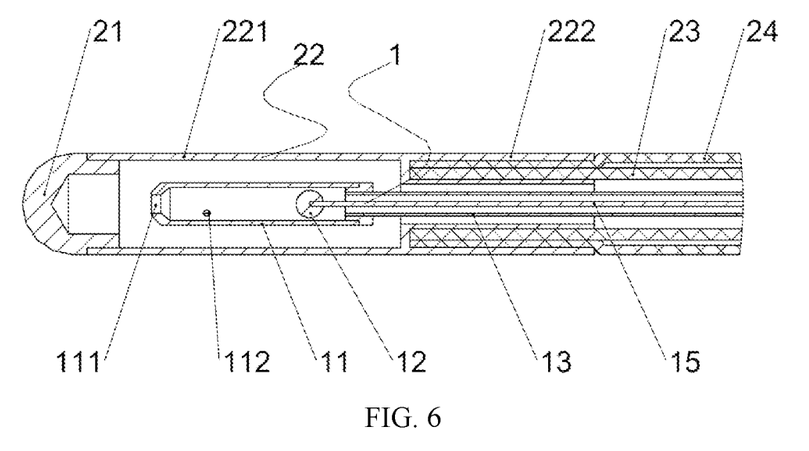
FIG. 6 is a schematic structural diagram of a needle part of a flexible cryoprobe with an adjustable flow in a cryoablation mode in an embodiment of the present invention.

FIG. 6 is a schematic structural diagram of a needle part of a flexible cryoprobe with an adjustable flow in a cryoablation mode in an embodiment of the present invention. With reference to FIG. 6, the needle catheter component 2 includes a needle tip 21, a needle 22, an inner tube assembly 23, and an outer tube assembly 24. The needle 22 includes a needle front section 221 and a needle rear section 222, where the needle front section 221 is fixedly sealed with the needle tip 21, the needle rear section 222 is fixedly connected to the inner tube assembly 23 and the outer tube assembly 24. A certain gap is provided between the inner tube assembly 23 and the outer tube assembly 24, and the gap is filled with a thermal insulation material or vacuumized to implement vacuum insulation of the flexible catheter section and prevent frostbite of a normal orifice.

In summary, since the certain gap is provided between the inner tube assembly and the outer tube assembly, a thermal insulation layer is arranged in the gap, which ensures that internal cold air cannot be guided to the outside to cause frostbite of the normal orifice, and ensures that external heat cannot be introduced into the assembly, thus ensuring the freezing effect.

Figure 7:
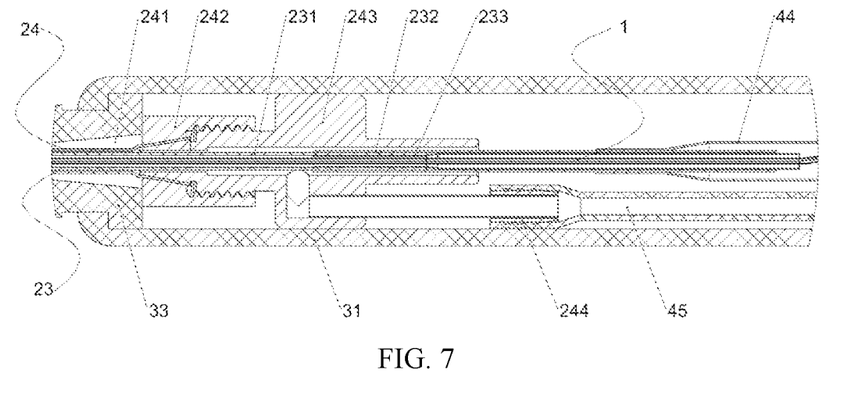
FIG. 7 is a schematic structural diagram of a handle front section of a flexible cryoprobe with an adjustable flow in an embodiment of the present invention.

FIG. 7 is a schematic structural diagram of a handle front section of a flexible cryoprobe with an adjustable flow in an embodiment of the present invention. Referring to FIG. 7, the inner tube assembly 23 includes an inner flexible catheter 231, a squeezing tube 232, and an air return connecting tube 233, where a front end of the air return connecting tube 233 is inserted into a rear end of the inner flexible catheter 231, and the squeezing tube 232 is sleeved at the rear end of the inner flexible catheter 231 and ensures connection strength and sealing in a squeezing mode.

The outer tube assembly 24 includes an outer flexible catheter 241, a quick tightening nut 242, a vacuum chamber 243, and a pagoda joint 244. A rear end of the outer flexible catheter 241 is flared and then sleeved on a front-end tapered surface of the vacuum chamber 243. The quick tightening nut 242 squeezes the outer flexible catheter 241 on the front-end tapered surface of the vacuum chamber 243, thereby ensuring connection strength and sealing.

The pagoda joint 244 is located on a branch of the vacuum chamber 243 and is in communication with the inside of the vacuum chamber 243. The outer tube assembly 24 is sleeved on the inner tube assembly 23, a rear end of the vacuum chamber 243 is fixedly sealed with an outer surface of the squeezing tube 232, and the vacuum hose 45 is sleeved on the pagoda joint 244. A vacuum pump inside the host can vacuumize the gap between the outer tube assembly 24 and the inner tube assembly 23 through the vacuum hose 45.

For example, the shunt tube 44 further includes a leading-out hole 441, and the leading-out hole 441 is used to lead out the branch of the bypass pipe 14 and fixedly seal the bypass pipe. The rear end of the bypass pipe 14 is inserted into the air inlet tube and fixedly sealed, and the air inlet tube 42 and the air return tube 43 are both inserted into the rear end of the shunt tube 44 and fixedly sealed.

Figure 8:
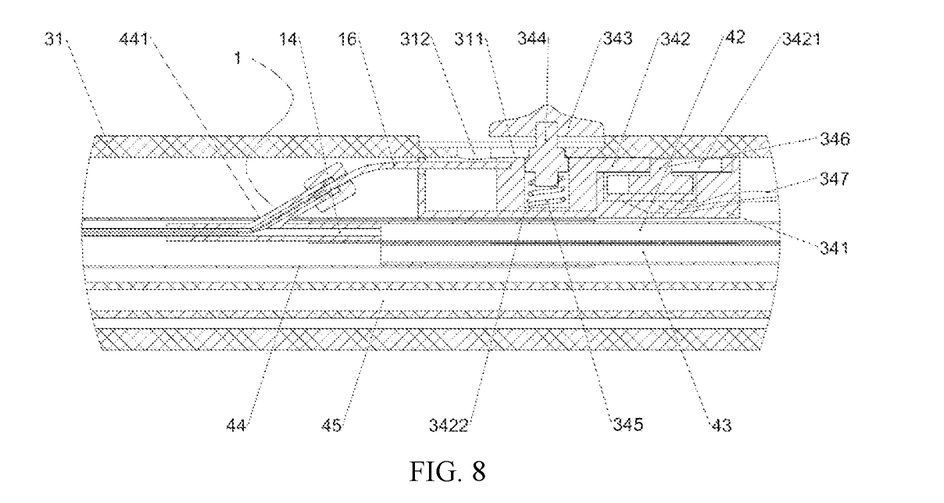
FIG. 8 is a schematic structural diagram of a handle rear section of a flexible cryoprobe with an adjustable flow in an embodiment of the present invention.

Referring to FIG. 8, the front handle 31 includes a sliding groove 311 and two limiting holes 312, the first limiting hole 312 in front corresponds to the cryoadhesion mode, and the second limiting hole 312 corresponds to the cryoablation mode. The button assembly 14 includes a button box 341, a sliding block 342, a button 343, a connecting rod 344, a spring 345, a toggle switch 346, and switch wires 347, where the sliding block 342 and the toggle switch 346 are placed in the button box 341, the button box 341 is fixed to an inner surface of the front handle 31, the sliding block 342 can slide back and forth in the button box 341, and the toggle switch 346 is fixed in the button box 341. A rear end of the sliding block 342 further includes a toggle groove 3421 and a connecting rod hole 3422. The toggle groove 3421 is used for the sliding block 342 to toggle the toggle switch 346 back and forth during sliding. A rear end of the thick drawn wire 16 passes through the button box 341 and is fixedly connected to a front end of the sliding block 342. The spring 345 and the connecting rod 344 are placed in the connecting rod hole 3422 of the sliding block 342. The connecting rod 344 is divided into four sections. The first section (the uppermost section in the figure) is used to connect to the button 343 and slide back and forth in the sliding groove 311, the second section is used to be inserted into the limiting hole 312 to fix the position of the button 343, the third section is used to clamp an upper limit position of the connecting rod 344 to prevent the connecting rod 344 from being pushed out by the spring 345, and the fourth section is used to be sleeved with the spring 345. The toggle switch is connected to three switch wires 347, and the switch wires 347 are connected to an internal circuit of the host and configured to open different gas pipelines in different modes.

The present application is further explained in detail below with reference to a usage process.

Referring to FIG. 6 and FIG. 8, in the cryoablation mode, the button 343 is toggled backward, the second section of the connecting rod 344 is clamped in the second limiting hole 312, the connecting rod 344 drives the sliding block 342 to move backward, and the sliding block 342 drives the sealing ball 121, by using the thick drawn wire 16 and the thin drawn wire 15, to move backward, thus opening the large air outlet 111. In addition, the toggle groove 3421 toggles the toggle switch 346 backward, and the switch wire 347 leads an electrical signal into the internal circuit of the host. The host first starts exhaust of all pipelines once to exhaust the original remaining gas, and then opens a cryoablation pipeline connected to nitrogen or argon. The nitrogen or argon is introduced into the flexible cryoprobe, passes through the air inlet tube 42, the bypass pipe 14, the J-T slot 13, and the regulating chamber 11, and is finally sprayed out to the needle front section 221 through the large air outlet 111 and the small air outlet 112 to complete throttling refrigeration, and absorbs a large amount of heat from a lesion tissue outside the needle 22 to form ice balls for ablation therapy. The nitrogen or argon that has absorbed heat is discharged out of the needle through the needle rear section 222, the inner flexible catheter 231, the air return connecting tube 233, the shunt tube 44, and the air return tube 43.

Figure 9:
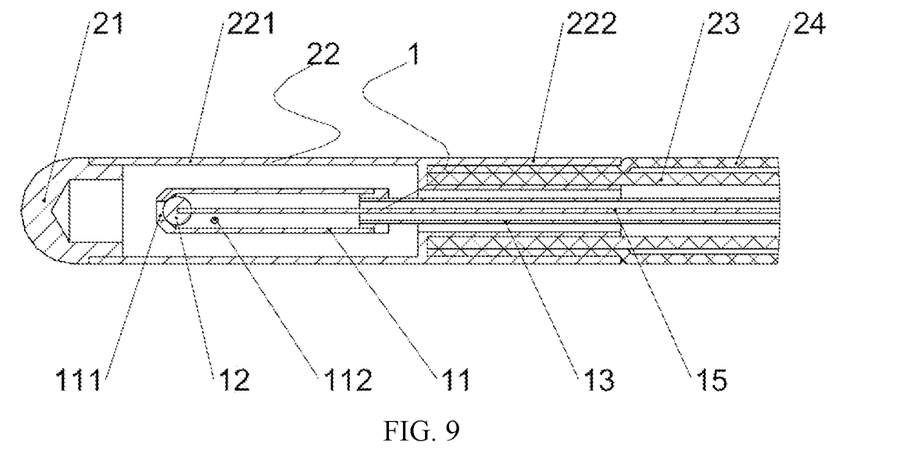
FIG. 9 is a schematic structural diagram of a needle part of a flexible cryoprobe with an adjustable flow in a cryoadhesion mode in an embodiment of the present invention.
Figure 10:
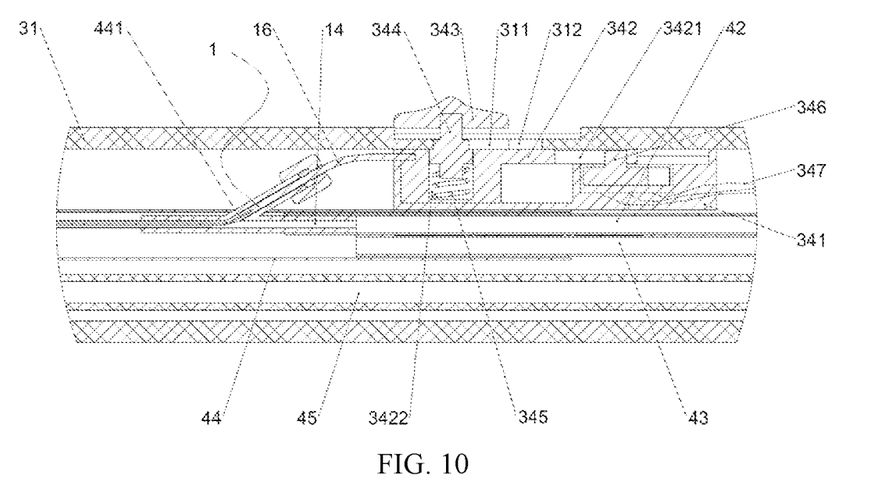
FIG. 10 is a schematic structural diagram of a handle rear section of a flexible cryoprobe with an adjustable flow in an embodiment of the present invention.

Referring to FIG. 9 and FIG. 10, when it is required to start the cryoadhesion mode, the button 343 is pressed to move the second section of the connecting rod 344 out of the second limiting hole 312. In this case, the spring 345 is compressed, and the first section of the connecting rod 344 enters the sliding groove 311, and pushes the button 343 forward. The connecting rod 344 drives the sliding block 342 to move forward, and the sliding block 342 drives the thick drawn wire 16 to be pushed into the bypass pipe 14. In this case, due to the existence of air flow in an air inlet pipeline, the sealing ball 121 is pushed forward by the air flow to abut against the sealing surface 113, thus blocking the large air outlet 111. After the button 343 is pushed to the bottom, the button 343 is released, and the connecting rod 344 is pushed out upward by the spring 345 until the second section thereof is clamped in the first limiting hole 312. In this case, the toggle groove 3421 toggles the toggle switch 346 forward, and the switch wire 347 leads the electrical signal into the internal circuit of the host. The host first starts exhaust of all pipelines once to exhaust the original remaining gas, and then opens a cryoadhesion pipeline connected to carbon dioxide or nitrous oxide, to introduce the carbon dioxide or nitrous oxide into the flexible cryoprobe. Finally, the carbon dioxide or nitrous oxide is sprayed out into the needle front section 221 through only the small air outlet 112, to implement cryoadhesion with a tissue outside the needle 22. Because the flow of the small air outlet 112 is relatively small, cold energy generated by throttling is almost completely absorbed by the tissue at the needle 22, so that the cold energy of the return gas is very small, avoiding hardening of the flexible catheter caused by an excessively low temperature.

Finally, it should be noted that the foregoing embodiments are used only to describe the technical solutions of the present invention, and are not intended to limit the present invention. Although the present invention is described in detail with reference to the foregoing embodiments, a person of ordinary skill in the art should understand that he/she can still modify the technical solutions described in each foregoing embodiment, or perform equivalent replacements on some or all of the technical features therein. Such modifications or replacements do not make the essence of the corresponding technical solution depart from the scope of the technical solution of each embodiment of the present invention.

What is claimed is:

1. A flow regulating assembly, comprising a mandrel, wherein a regulating chamber is provided in the mandrel;
   a first end portion of the mandrel is provided with a large air outlet, a side wall of the mandrel is provided with a small air outlet, and the large air outlet has an inner diameter less than that of the regulating chamber;
   a second end portion of the mandrel is connected to a front end of a J-T slot, and a rear end of the J-T slot is connected to a bypass pipe;
   a sealing member is arranged in the regulating chamber, and the sealing member has an outer diameter less than the inner diameter of the regulating chamber and greater than the inner diameter of the large air outlet;
   the sealing member is connected to one end of a traction member, and the other end of the traction member is led out through the bypass pipe;
   a tail end of the bypass pipe is provided with a sealing assembly, the sealing assembly comprises a sealing ring, and an inner diameter of the sealing ring matches an outer diameter of the traction member, to allow the traction member to pass through;
   wherein the sealing member axially moves in the regulating chamber under an action of the traction member, and a quantity of effective air outlets that are in the large air outlet and the small air outlet and are in communication with the bypass pipe is changed by adjusting a position of the sealing member;
   at least one small air outlet is provided;
   wherein when the sealing member is at the large air outlet in the first end portion of the mandrel, the large air outlet is closed, and the small air outlet is in communication with the bypass pipe to be used as the effective air outlet for gas venting; in this case, a formed flow is minimum, and the flow regulating assembly is configured to introduce carbon dioxide or nitrous oxide to implement a cryoadhesion mode; and
   when the sealing member moves to the second end portion of the mandrel under traction of the traction member, the large air outlet and the small air outlet are in communication with the bypass pipe to be used as the effective air outlets for gas venting; in this case, a formed flow is maximum, and the flow regulating assembly is configured to introduce nitrogen or argon to implement a cryoablation mode.

2. The flow regulating assembly according to claim 1, wherein the sealing assembly further comprises a sealing ring pressing member, the sealing ring pressing member is sleeved at the tail end of the bypass pipe, the sealing ring is clamped between the sealing ring pressing member and the tail end of the bypass pipe in a length direction of the bypass pipe, and the sealing ring pressing member is provided with a through hole for the traction member to pass through.

3. A flexible cryoprobe with an adjustable flow, comprising the flow regulating assembly according to claim 1, wherein the flexible cryoprobe further comprises: a needle catheter component, a handle component, and an extension tube component, wherein the extension tube component comprises an air inlet tube, an air return tube, and a regulating tube;
   the flow regulating assembly is arranged inside the needle catheter component, and the needle catheter component is connected to the handle component;
   the air inlet tube is connected to the bypass pipe in the flow regulating assembly, and a gas in the regulating chamber is discharged through the air return tube; and
   the regulating tube is configured to directly or indirectly adjust an axial position of the sealing member in the regulating chamber.

4. The flexible cryoprobe according to claim 3, wherein the needle catheter component comprises a needle tip, a needle, an inner tube assembly, and an outer tube assembly; and
   the needle comprises a needle front section and a needle rear section, the needle tip is arranged on a front end portion of the needle, and the needle rear section is fixedly connected to the inner tube assembly and the outer tube assembly.

5. The flexible cryoprobe according to claim 4, wherein a thermal insulation layer is arranged between the inner tube assembly and the outer tube assembly, and the thermal insulation layer is a thermal insulation material or a vacuum layer.

6. The flexible cryoprobe according to claim 4, wherein the regulating chamber is arranged inside the needle front section, the J-T slot is provided inside the inner tube assembly, and a gas in the needle returns through a gap between the inner tube assembly and the J-T slot.

7. The flexible cryoprobe according to claim 3, wherein the handle component is provided with a toggle rod and a connecting member, one end of the connecting member is connected to the traction member, the other end of the connecting member is connected to the toggle rod, and the axial position of the sealing member in the regulating chamber is adjusted by the toggle rod.

8. The flexible cryoprobe with an adjustable flow according to claim 3, wherein the sealing assembly further comprises a sealing ring pressing member, the sealing ring pressing member is sleeved at the tail end of the bypass pipe, the sealing ring is clamped between the sealing ring pressing member and the tail end of the bypass pipe in a length direction of the bypass pipe, and the sealing ring pressing member is provided with a through hole for the traction member to pass through.

9. The flexible cryoprobe according to claim 4, wherein the handle component is provided with a toggle rod and a connecting member, one end of the connecting member is connected to the traction member, the other end of the connecting member is connected to the toggle rod, and the axial position of the sealing member in the regulating chamber is adjusted by the toggle rod.

10. The flexible cryoprobe according to claim 5, wherein the handle component is provided with a toggle rod and a connecting member, one end of the connecting member is connected to the traction member, the other end of the connecting member is connected to the toggle rod, and the axial position of the sealing member in the regulating chamber is adjusted by the toggle rod.

11. The flexible cryoprobe according to claim 6, wherein the handle component is provided with a toggle rod and a connecting member, one end of the connecting member is connected to the traction member, the other end of the connecting member is connected to the toggle rod, and the axial position of the sealing member in the regulating chamber is adjusted by the toggle rod.

\* \* \* \* \*